United States Patent
Qu et al.

(10) Patent No.: US 11,609,776 B1
(45) Date of Patent: Mar. 21, 2023

(54) ELASTIC INTERNET PROTOCOL (IP) ADDRESS FOR HYPERVISOR AND VIRTUAL ROUTER MANAGEMENT IN A BRANCH ENVIRONMENT

(71) Applicant: Cisco Technology, Inc., San Jose, CA (US)

(72) Inventors: Yanping Qu, Fremont, CA (US); Sabita Jasty, San Jose, CA (US); Yegappan Lakshmanan, Union City, CA (US); Kaushik Pratap Biswas, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 409 days.

(21) Appl. No.: 16/725,527

(22) Filed: Dec. 23, 2019

(51) Int. Cl.
*G06F 9/455* (2018.01)
*G06F 9/54* (2006.01)
*H04L 49/00* (2022.01)
*H04L 49/15* (2022.01)
*G06F 11/14* (2006.01)
*H04L 45/586* (2022.01)

(52) U.S. Cl.
CPC .......... *G06F 9/45558* (2013.01); *G06F 9/542* (2013.01); *G06F 9/546* (2013.01); *G06F 11/1484* (2013.01); *H04L 45/586* (2013.01); *H04L 49/15* (2013.01); *H04L 49/70* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,802,000 B1 * | 9/2010 | Huang | .................. | H04L 61/106 709/228 |
| 7,990,994 B1 * | 8/2011 | Yeh | ..................... | H04L 12/4641 711/147 |
| 8,478,902 B1 * | 7/2013 | Holland | .................. | G06F 9/455 709/250 |
| 8,549,187 B1 * | 10/2013 | Christopher | ........ | H04L 61/5038 710/9 |
| 9,154,367 B1 * | 10/2015 | Kontothanassis | ....... | G06F 9/505 |
| 10,007,445 B2 * | 6/2018 | Nithrakashyap | ...... | G06F 16/113 |
| 10,243,920 B1 * | 3/2019 | Dickinson | ........... | H04L 61/2015 |
| 10,601,779 B1 * | 3/2020 | Matthews | ............. | H04L 67/141 |
| 10,608,942 B1 * | 3/2020 | Shaikh | .................. | H04L 47/125 |
| 10,965,637 B1 * | 3/2021 | Nayak | ................. | H04L 61/2007 |
| 11,025,483 B1 * | 6/2021 | Hashmi | ................. | H04L 63/164 |
| 2005/0114492 A1 * | 5/2005 | Arberg | ................ | H04L 61/5014 709/246 |

(Continued)

*Primary Examiner* — Adam Lee
(74) *Attorney, Agent, or Firm* — Merchant & Gould P.C.

(57) ABSTRACT

An elastic Internet Protocol (IP) address for hypervisor and virtual router management in a branch environment may be provided. First, an IP address may be assigned to a hypervisor associated with a virtual branch. Next, it may be determined that a virtual machine (VM) has been instantiated at the virtual branch. In response to determining that the VM has been instantiated at the virtual branch, the IP address may then be released. It may next be determined that the VM is in a failed state and then, in response to determining that the VM is in the failed state, the IP address may be reassigned to the hypervisor.

20 Claims, 4 Drawing Sheets

(56) References Cited

U.S. PATENT DOCUMENTS

| | | | |
|---|---|---|---|
| 2005/0204183 A1* | 9/2005 | Saika | G06F 11/2025 714/4.11 |
| 2007/0022129 A1* | 1/2007 | Bahar | G06F 9/5011 |
| 2007/0150594 A1* | 6/2007 | Andreev | H04L 69/40 709/226 |
| 2010/0098082 A1* | 4/2010 | Sampath | H04L 45/16 370/392 |
| 2010/0115080 A1* | 5/2010 | Kageyama | H04L 29/12028 709/223 |
| 2010/0146074 A1* | 6/2010 | Srinivasan | G06F 9/5077 709/218 |
| 2011/0071981 A1* | 3/2011 | Ghosh | G06F 11/2038 707/703 |
| 2011/0313973 A1* | 12/2011 | Srivas | G06F 16/182 707/634 |
| 2013/0198746 A1* | 8/2013 | Kruglick | G06F 9/45558 718/1 |
| 2013/0308641 A1* | 11/2013 | Ackley | G06F 9/45558 370/392 |
| 2013/0318219 A1* | 11/2013 | Kancherla | H04L 49/70 709/222 |
| 2013/0339781 A1* | 12/2013 | Wamorkar | G06F 11/2028 714/E11.073 |
| 2014/0050160 A1* | 2/2014 | Ronneke | H04W 4/70 370/329 |
| 2014/0297889 A1* | 10/2014 | Dong | H04L 61/103 709/245 |
| 2014/0380087 A1* | 12/2014 | Jamjoom | G06F 11/2002 714/4.11 |
| 2015/0074168 A1* | 3/2015 | Hartman | G06F 16/13 709/201 |
| 2015/0172760 A1* | 6/2015 | AbiEzzi | A63F 13/32 725/39 |
| 2015/0178697 A1* | 6/2015 | Rossmann | G07F 19/211 705/43 |
| 2015/0254103 A1* | 9/2015 | Chandrasekaran | G06F 9/4856 718/1 |
| 2015/0293896 A1* | 10/2015 | Runkis | G06F 3/0623 707/755 |
| 2016/0127509 A1* | 5/2016 | Uriel | G06F 9/45558 709/203 |
| 2016/0337084 A1* | 11/2016 | Wen | H04L 43/065 |
| 2016/0359805 A1* | 12/2016 | Spraggs | H04L 41/0806 |
| 2017/0063801 A1* | 3/2017 | Faynberg | H04L 63/0281 |
| 2017/0118067 A1* | 4/2017 | Vedula | H04L 43/10 |
| 2017/0214660 A1* | 7/2017 | Shah | H04L 67/42 |
| 2017/0235950 A1* | 8/2017 | Gopalapura Venkatesh | G06F 11/2046 726/24 |
| 2018/0123984 A1* | 5/2018 | Sharma | H04L 49/9047 |
| 2019/0028442 A1* | 1/2019 | Pillai | H04L 61/6022 |
| 2019/0306231 A1* | 10/2019 | Shimoga Manjunatha | H04L 61/255 |
| 2019/0310871 A1* | 10/2019 | Desmouceaux | H04L 45/586 |

* cited by examiner

ELASTIC INTERNET PROTOCOL (IP) ADDRESS FOR HYPERVISOR AND VIRTUAL ROUTER MANAGEMENT IN A BRANCH ENVIRONMENT

TECHNICAL FIELD

The present disclosure relates generally to hypervisors and virtual router management.

BACKGROUND

A computer network or data network is a telecommunications network that allows computers to exchange data. In computer networks, networked computing devices exchange data with each other using a data link. The connections between nodes are established using either cable media or wireless media. The best-known computer network is the Internet.

Network computer devices that originate, route, and terminate the data are called network nodes. Nodes can include hosts such as personal computers, phones, servers as well as networking hardware. Two such devices can be said to be networked together when one device is able to exchange information with the other device, whether or not they have a direct connection to each other. Computer networks differ in the transmission medium used to carry their signals, the communications protocols to organize network traffic, the network's size, topology, and organizational intent.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
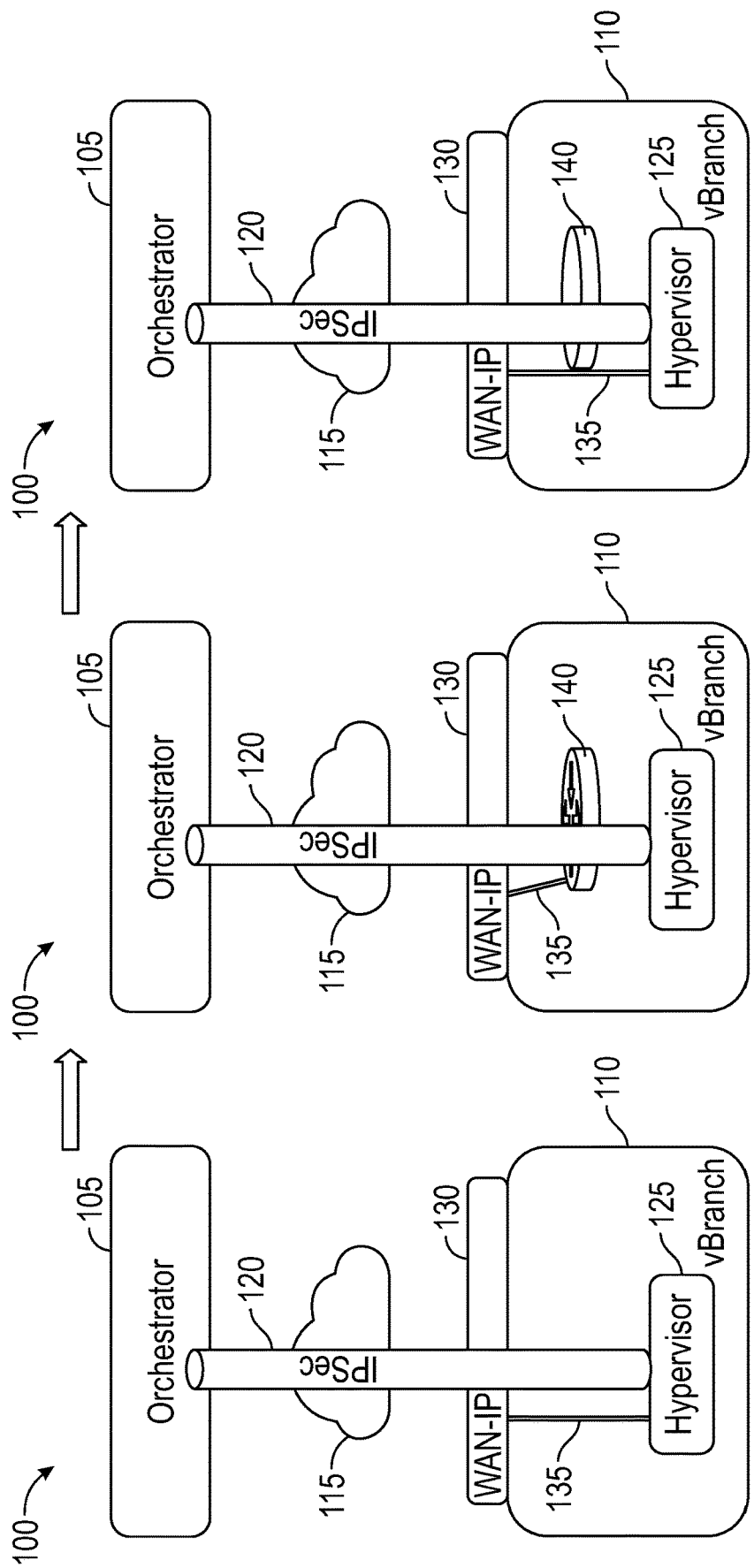
FIG. 1A, FIG. 1B, and FIG. 1C are block diagrams of an operating environment for providing an elastic Internet Protocol (IP) address for hypervisor and virtual router management in a branch environment.

An elastic Internet Protocol (IP) address for hypervisor and virtual router management in a branch environment may be provided. First, an IP address may be assigned to a hypervisor associated with a virtual branch. Next, it may be determined that a virtual machine (VM) has been instantiated at the virtual branch. In response to determining that the VM has been instantiated at the virtual branch, the IP address may then be released. It may next be determined that the VM is in a failed state and then, in response to determining that the VM is in the failed state, the IP address may be reassigned to the hypervisor.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Service providers may provide branch deployment infrastructure to allow enterprises (e.g., banks, retail stores, etc.) to access networks such as the Internet at a branch site. With conventional branch deployment infrastructure, service providers may give one public Internet Protocol (IP) address to each branch site. However with virtual branch (i.e., vBranch) deployments, two public IP addresses may be needed: i) one IP address may be for a hypervisor of the virtual branch for managing the host system and the virtual machines running on the host system; and ii) the other IP address may be for a virtual router (i.e., vRouter) that may handle traffic routing for the virtual branch. Even if the virtual router is configured in a way that the virtual router takes the public IP address, and traffic for managing the hypervisor passes through the virtual router, the virtual branch site may become un-reachable and un-recoverable when, for example, the virtual router is in error (i.e., in a failed state). To address this problem, embodiments of the disclosure may allow virtual branch deployments in current service provider branch deployment infrastructure where one public IP address is given to each virtual branch. This may allow one public IP address to be shared seamlessly between the virtual branch's hypervisor and the virtual branch's virtual router and may ensure that a service provider's orchestrator may connect to the virtual branch site.

Embodiments of the disclosure may allow virtual branch deployment that may fit into existing service provider branch deployment infrastructure, allowing one public IP address to be shared seamlessly between a hypervisor and a virtual router, and may ensure the reachability of the branch site for management. Each virtual branch may take one public IP address from the service provider. For example, a virtual branch's hypervisor may take a public IP address initially and may allow a service provider's orchestrator to manage the virtual branch's host system and deploy virtual machines including a virtual router on the virtual branch's host system. The hypervisor may releases the IP address and the virtual router may take the IP address when the virtual router becomes active. The virtual router may be configured in a way that management traffic between the orchestrator and the hypervisor may go through the virtual router. Accordingly, the orchestrator may continue to manage the virtual branch.

The hypervisor may monitor the health of the virtual router. When failure is detected in the virtual router by the hypervisor, per failover policy, the hypervisor may take the public IP address back and may send a virtual router failure event notification to the orchestrator. Because the hypervisor has now taken the public IP address, reachability of the virtual branch may be accomplished. The orchestrator may continue managing the virtual branch, for example, the orchestrator may trouble shoot the virtual router failure and may bring the virtual router back up.

FIG. 1A, FIG. 1B, and FIG. 1C show an operating environment 100 including a flow for sharing one public IP address between, for example, a hypervisor and virtual router. As shown in FIG. 1A, FIG. 1B, and FIG. 1C, operating environment 100 may comprise an orchestrator 105, a virtual branch 110, a network 115, and a secured tunnel 120. Network 115 may comprise, but is not limited to, the Internet. Secured tunnel 120 may comprise, but is not limited to, an Internet Protocol Security (IPsec) tunnel. IPsec may comprise a secure network protocol suite that may authenticate and encrypt packets of data to provide secure encrypted communication between, for example, two computers over an IP network. IPsec may be used in virtual private networks (VPNs) for example.

Orchestrator 105 may manage and program the behavior of virtual branch 110's host system so that virtual branch 110 may coordinate with its hardware and software elements to further support applications and services. Orchestrator 105 may separate virtual branch 110's services from virtual branch 110's components while configuring virtual branch 110 per the service provider's specifications.

Virtual branch 110 may comprise a host system that may provide resources that may be accessible, for example, online via a computer, mobile device, or tablet that may allow access to services such as financial services or retail store services for example. Virtual branch 110 may comprise a hypervisor 125, an interface 130, a link 135, and a virtual machine (VM) 140. Hypervisor 125 may comprise Network Function Virtualization Infrastructure Software (NFVIS). NFVIS may comprise an advanced type of hypervisor software platform that implements full life management from orchestrator 105 and controller for virtualized services.

VM 140 may comprise, but is not limited to, a virtual router for example. In other words, the virtual router may comprise a virtual machine that may provide a routing function running on virtual branch 110. The virtual router may be deployed with a day-0 configuration so that it may take the IP address (e.g., a public IP address) and route traffic when it is up. The virtual router may be configured to be monitored by a component of hypervisor 125 as will be described in greater detail below.

Virtual branch 110 may comprise a host system of one or more processing units and may instantiate one or more virtual machines at the command and control of orchestrator 105. These virtual machines may comprise, but are not limited to, hypervisor 125 or VM 140 (e.g., a virtual router). Interface 130 may be accessed by the one public IP address as described above. Link 135 may be passed between hypervisor 125 and VM 140 consistent with embodiments as described in greater detail below. In other words, link 135 may connect hypervisor 125 and interface 130 when hypervisor 125 has the one public IP address (e.g., FIG. 1A) and link 135 may connect VM 140 (e.g., a virtual router) and interface 130 when VM 140 (e.g., a virtual router) has the one public IP address (e.g., FIG. 1B).

Embodiments of the disclosure may allow virtual branch 110's deployment into existing service provider branch deployment infrastructure, may allow one public IP address to be shared seamlessly between hypervisor 125 and VM 140 (e.g., virtual router), and may ensure the reachability of virtual branch 110 for management by orchestrator 105. Virtual branch 110 may take one public IP address from the service provider. For example, virtual branch 110's hypervisor 125 may take a public IP address initially and may allow orchestrator 105 to manage a host system of virtual branch 110 and deploy virtual machines including VM 140 (e.g., a virtual router) on virtual branch 110 (e.g., FIG. 1A).

Hypervisor 125 may release the IP address and VM 140 (e.g., virtual router) may take the IP address when VM 140 becomes active (e.g., FIG. 1B). VM 140 may be configured in a way that management traffic between orchestrator 105 and hypervisor 125 may go through VM 140. Accordingly, orchestrator 105 may continue to manage virtual branch 110.

Hypervisor 125 may monitor the health of VM 140. When failure (i.e., a failed state) is detected in VM 140 by hypervisor 125, per failover policy, hypervisor 125 may take the IP address (e.g., the public IP address) back and may send a virtual router failure event notification to orchestrator 105. Because hypervisor 125 has now taken the public IP address, reachability of virtual branch 110 may be accomplished (e.g., FIG. 1C). Orchestrator 105 may continue managing virtual branch 110, for example, orchestrator 105 may trouble shoot VM 140's (i.e., virtual router) failure and may bring VM 140 back up (i.e., re-instantiate).

Figure 2:
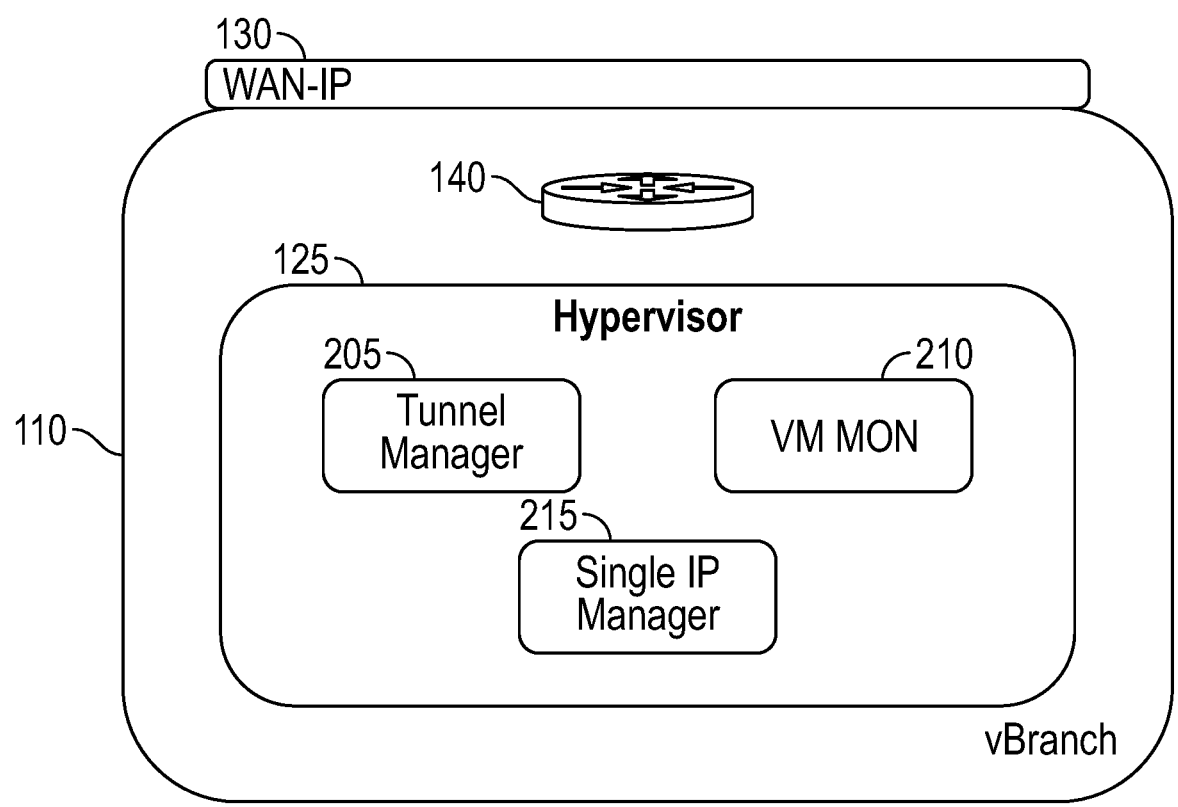
FIG. 2 is a block diagram of a virtual branch.

FIG. 2 shows virtual branch 110 in greater detail. As shown in FIG. 2, virtual branch 110 may comprise a plurality of components, for example, a tunnel manager 205, a VM monitor 210, and a single IP manager 215. These components may comprise, but are not limited to, software components, hardware components, or firmware components. VM monitor 210 may monitor the health of virtual machines such as VM 140 (i.e., virtual router) running on virtual branch 110. When VM 140 (i.e., virtual router) failure is detected, VM monitor 210 may report the failure to relevant components of hypervisor 125 such as single IP manager 215. Orchestrator 105 may also retrieve the failure event notification when connectivity to virtual branch 110 is available.

Single IP manager 215 may manage the IP address (e.g., public IP address) assignment on hypervisor 125. Single IP manager 215 may releases the IP address when VM 140 (i.e., virtual router), which may have taken the IP address, is deployed on virtual branch 110. When single IP manager 215 is notified by VM monitor 210 that VM 140 (i.e., virtual router) is down (i.e., in a failed state), single IP manager 215 may reassign the IP address back to hypervisor 125.

Tunnel manager 205 may manage, working together with VM monitor 210 and single IP manager 215, the secured connectivity between hypervisor 125 and orchestrator 105. During the IP address transitioning between hypervisor 125 and VM 140 (i.e., virtual router) as described above, the connectivity of virtual branch 110 with orchestrator 105 may interrupted. Tunnel manager 205 may insure that the secure connectivity may be reestablish when VM 140 (i.e., virtual router) is active and has the IP address, and when hypervisor 125 takes back the IP address due to VM 140's (i.e., virtual router) failure. With an IPSec tunnel between hypervisor 125 and orchestrator 105, orchestrator 105 may connect to hypervisor 125 via the same system IP address (i.e., secured tunnel 120's IP address on the hypervisor 125 side). Consequently, orchestrator 105 may not see a different IP address to reach hypervisor 125 when the public IP address is switched between hypervisor 125 and VM 140 (i.e., virtual router).

The elements described above of operating environment 100 (e.g., orchestrator 105 and virtual branch 110) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 3:
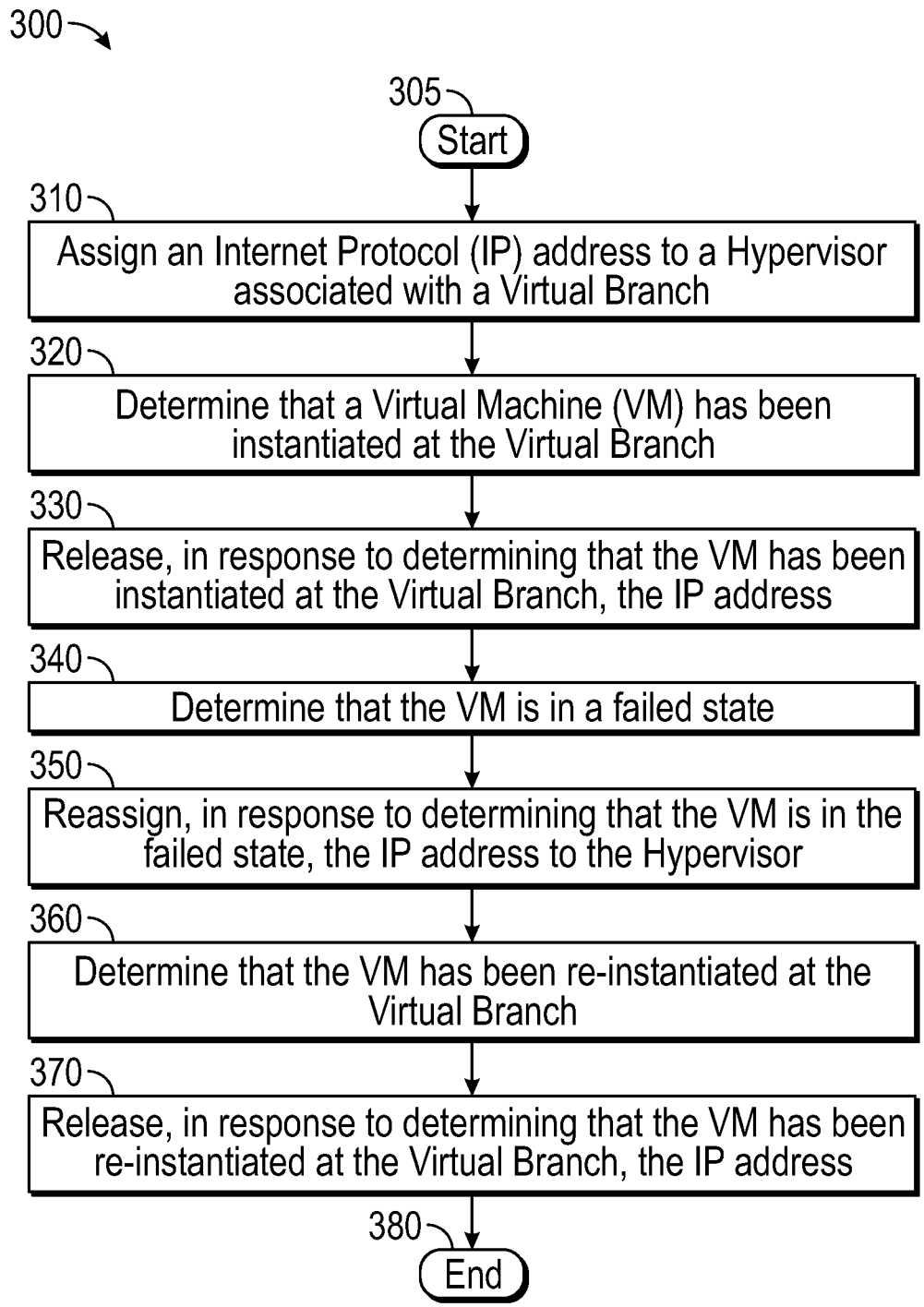
FIG. 3 is a flow chart of a method for providing an elastic IP address for hypervisor and virtual router management in a branch environment.

FIG. 3 is a flow chart setting forth the general stages involved in a method 300 consistent with an embodiment of the disclosure for providing an elastic Internet Protocol (IP) address for hypervisor and virtual router management in a branch environment. Method 300 may be implemented using hypervisor 125 as described in more detail above with respect to FIG. 1A, FIG. 1B, FIG. 1C, and FIG. 2. Ways to implement the stages of method 300 will be described in greater detail below.

Method 300 may begin at starting block 305 and proceed to stage 310 where hypervisor 125 may assign an Internet Protocol (IP) address to hypervisor 125 associated with virtual branch 110. For example, virtual branch 110 may take one public IP address from the service provider. Virtual branch 110's hypervisor 125 may take the public IP address initially and may allow orchestrator 105 to manage the host system of virtual branch 110 and deploy virtual machines including VM 140 (e.g., a virtual router) on virtual branch 110. In this way, embodiments of the disclosure may allow virtual branch 110's deployment into existing service provider branch deployment infrastructure, may allow one public IP address to be shared seamlessly between hypervisor 125 and VM 140 (e.g., virtual router), and may ensure the reachability of virtual branch 110 for management by orchestrator 105.

From stage 310, where hypervisor 125 assigns the IP address to hypervisor 125 associated with virtual branch 110, method 300 may advance to stage 320 where hypervisor 125 may determine that VM 140 has been instantiated at virtual branch 110. For example, hypervisor 125 may monitor the activity of orchestrator 105 and determine that orchestrator 105 deployed (i.e., instantiated) VM 140 (e.g., a virtual router) on virtual branch 110.

Once hypervisor 125 determines that VM 140 has been instantiated at virtual branch 110 in stage 320, method 300 may continue to stage 330 where hypervisor 125 may release, in response to determining that VM 140 has been instantiated at virtual branch 110, the IP address. For example, hypervisor 125 may release the IP address and VM 140 (e.g., virtual router) may take the IP address when VM 140 becomes active. VM 140 may be configured in a way that management traffic between orchestrator 105 and hypervisor 125 may go through VM 140. Accordingly, orchestrator 105 may continue to manage virtual branch 110.

After hypervisor 125 releases, in response to determining that VM 140 has been instantiated at virtual branch 110, the IP address in stage 330, method 300 may proceed to stage 340 where hypervisor 125 may determine that VM 140 is in a failed state. Hypervisor 125 may monitor the health of VM 140. For example, VM monitor 210 may monitor the health of virtual machines such as VM 140 (i.e., virtual router) running on virtual branch 110. When VM 140's (i.e., virtual router) failure is detected, VM monitor 210 may report the failure to relevant components of hypervisor 125 such as single IP manager 215. Orchestrator 105 may also retrieve the failure event notification when connectivity to virtual branch 110 is available.

From stage 340, where hypervisor 125 determines that VM 140 is in a failed state, method 300 may advance to stage 350 where hypervisor 125 may reassign, in response to determining that VM 140 is in the failed state, the IP address to hypervisor 125. For example, when failure (i.e., a failed state) is detected in VM 140 by hypervisor 125, per failover policy, hypervisor 125 may take the IP address (e.g., the public IP address) back and may send a virtual router failure event notification to orchestrator 105. Because hypervisor 125 has now taken the public IP address, reachability of virtual branch 110 may be accomplished. Orchestrator 105 may continue managing virtual branch 110, for example, orchestrator 105 may trouble shoot VM 140's (i.e., virtual router) failure and may bring VM 140 back up (i.e., re-instantiate).

Once hypervisor 125 reassigns, in response to determining that VM 140 is in the failed state, the IP address to hypervisor 125 in stage 350, method 300 may continue to stage 360 where hypervisor 125 may determine that VM 140 has been re-instantiated at virtual branch 110. For example, orchestrator 105 may trouble shoot VM 140's (i.e., virtual router) failure and may bring VM 140 back up. As stated above, hypervisor 125 may monitor the health of VM 140 and determine that VM 140 has been brought back up (i.e., re-instantiated).

After hypervisor 125 determines that VM 140 has been re-instantiated at virtual branch 110 in stage 360, method 300 may proceed to stage 370 where hypervisor 125 may release, in response to determining that VM 140 has been re-instantiated at virtual branch 110, the IP address. For example, hypervisor 125 may release the IP address and VM 140 (e.g., virtual router) may take the IP address when VM 140 becomes active in response to being re-instantiated. VM 140 may be configured in a way that management traffic between orchestrator 105 and hypervisor 125 may go through VM 140. Accordingly, orchestrator 105 may continue to manage virtual branch 110. Once hypervisor 125 releases, in response to determining that VM 140 has been re-instantiated at virtual branch 110, the IP address in stage 370, method 300 may then end at stage 380.

Figure 4:
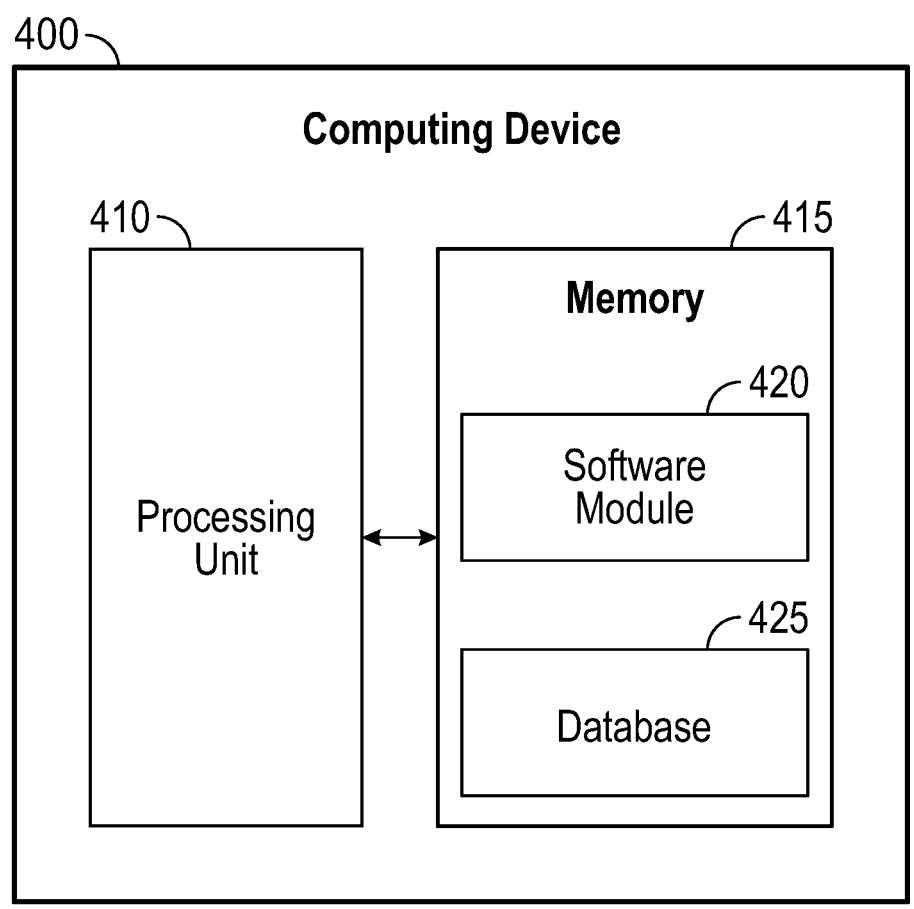
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for providing elastic Internet Protocol (IP) address for hypervisor and virtual router management in a branch environment as described above with respect to FIG. 3. Computing device 400, for example, may provide an operating environment for orchestrator 105 and virtual branch 110. Orchestrator 105 and virtual branch 110 may operate in other environments and are not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1A, FIG. 1B, and FIG. 1C, may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
assigning, by a hypervisor, an Internet Protocol (IP) address to the hypervisor located at a virtual branch;
instantiating a virtual machine (VM) at the virtual branch by an orchestrator through the hypervisor;
determining, by the hypervisor, that the VM has been instantiated at the virtual branch;
releasing, by the hypervisor and in response to determining that the VM has been instantiated at the virtual branch, the IP address assigned to the hypervisor, and reassigning the same IP address released by the hypervisor to the VM, the VM being co-located at the virtual branch with the hypervisor;
determining, by the hypervisor, that the VM is in a failed state;
taking, by the hypervisor and in response to determining that the VM is in the failed state, the same IP address assigned to the VM from the VM and assigning the same IP address back to the hypervisor, wherein the same IP address is transferred back and forth between the VM and the hypervisor based on the operating state of the VM;
re-instantiating the VM at the virtual branch by the orchestrator through the hypervisor; and
releasing, by the hypervisor and in response to re-instantiating the VM, the same IP address from the hypervisor and reassigning the same IP address back to the VM, wherein the same IP address is shared only between the VM and the hypervisor.

2. The method of claim 1, further comprising sending, by the hypervisor and in response to determining that the VM is in the failed state, a failure event notification to the orchestrator.

3. The method of claim 1, further comprising passing management traffic between the orchestrator and the hypervisor, wherein the management traffic passes through the VM when the VM is not in the failed state, and wherein the management traffic does not pass through the VM when the VM is in the failed state.

4. The method of claim 3, wherein passing the management traffic between the orchestrator and the hypervisor comprises passing the management traffic over an Internet Protocol Security (IPsec) tunnel.

5. The method of claim 1, wherein the VM comprises a virtual router.

6. The method of claim 1, wherein the orchestrator troubleshoots the VM when the VM is in the failed state.

7. The method of claim 1, wherein the hypervisor comprises a tunnel manager, a single IP manager, and a VM monitor.

8. An apparatus comprising:
a memory storage; and
a processing unit coupled to the memory storage, wherein the processing unit is operative to:
assign, by a hypervisor, an Internet Protocol (IP) address to the hypervisor located at a virtual branch, the hypervisor being instantiated on the apparatus wherein a virtual machine (VM) is instantiated at the virtual branch by an orchestrator through the hypervisor;
determine, by the hypervisor, that the VM has been instantiated at the virtual branch;
release, by the hypervisor and in response to determining that the VM has been instantiated at the virtual branch, the IP address assigned to the hypervisor, and reassign the same IP address released by the hypervisor to the VM, the VM being co-located at the virtual branch with the hypervisor;
determine, by the hypervisor, that the VM is in a failed state;
take, by the hypervisor and in response to determining that the VM is in the failed state, the same IP address assigned to the VM from the VM and assigning the same IP address back to the hypervisor, wherein the same IP address is transferred back and forth between the VM and the hypervisor based on the operating state of the VM, and wherein the VM is re-instantiated at the virtual branch by the orchestrator through the hypervisor;
release, by the hypervisor and in response to the re-instantiation of the VM, the same IP address from the hypervisor and reassign the same IP address back to the VM, wherein the same IP address is shared only between the VM and the hypervisor.

9. The apparatus of claim 8, wherein the processing unit is further operative to send, by the hypervisor and in response to determining that the VM is in the failed state, a failure event notification to the orchestrator.

10. The apparatus of claim 8, wherein management traffic passes between the orchestrator and the hypervisor, wherein the management traffic passes through the VM when the VM is not in the failed state, and wherein the management traffic does not pass through the VM when the VM is in the failed state.

11. The apparatus of claim 10, wherein the processing unit is further operative to pass the management traffic between the orchestrator and the hypervisor over an Internet Protocol Security (IPsec) tunnel.

12. The apparatus of claim 8, wherein the VM comprises a virtual router.

13. The apparatus of claim 8, wherein the orchestrator troubleshoots the VM when the VM is in the failed state.

14. The apparatus of claim 8, wherein the hypervisor comprises a tunnel manager, a single IP manager, and a VM monitor.

15. A non-transitory computer-readable medium that stores a set of instructions which when executed perform a method comprising:
assigning, by a hypervisor, an Internet Protocol (IP) address to the hypervisor located at a virtual branch;
instantiating a virtual machine (VM) at the virtual branch by an orchestrator through the hypervisor;
determining, by the hypervisor, that the VM has been instantiated at the virtual branch;
releasing, by the hypervisor and in response to determining that the VM has been instantiated at the virtual branch, the IP address assigned to the hypervisor, and reassigning the same IP address released by the hypervisor to the VM, the VM being co-located at the virtual branch with the hypervisor;
determining, by the hypervisor, that the VM is in a failed state;
taking, by the hypervisor and in response to determining that the VM is in the failed state, the same IP address assigned to the VM from the VM and assigning the same IP address back to the hypervisor, wherein the same IP address is transferred back and forth between the VM and the hypervisor based on the operating state of the VM;
the VM at the virtual branch by the orchestrator through the hypervisor; and
releasing, by the hypervisor and in response to the VM, the same IP address from the hypervisor and reassigning the same IP address back to the VM, wherein the same IP address is shared only between the VM and the hypervisor.

16. The non-transitory computer-readable medium of claim 15, further comprising sending, by the hypervisor and in response to determining that the VM is in the failed state, a failure event notification to the orchestrator.

17. The non-transitory computer-readable medium of claim 15, further comprising passing management traffic between the orchestrator and the hypervisor, wherein the management traffic passes through the VM when the VM is not in the failed state, and wherein the management traffic does not pass through the VM when the VM is in the failed state.

18. The non-transitory computer-readable medium of claim 17, wherein passing the management traffic between the orchestrator and the hypervisor comprises passing the management traffic over an Internet Protocol Security (IPsec) tunnel.

19. The non-transitory computer-readable medium of claim 15, wherein the VM comprises a virtual router.

20. The non-transitory computer-readable medium of claim 15, wherein the orchestrator troubleshoots the VM when the VM is in the failed state, and wherein the hypervisor comprises a tunnel manager, a single IP manager, and a VM monitor.

* * * * *